United States Patent
Howard et al.

(10) Patent No.: US 7,457,867 B2
(45) Date of Patent: Nov. 25, 2008

(54) RELIABLE NON-REPUDIABLE SYSLOG SIGNING AND ACKNOWLEDGEMENT

(75) Inventors: Brett Howard, Nepean (CA); Paul Kierstead, Ottawa (CA)

(73) Assignee: Alcatel Lucent, Paris (FR)

( * ) Notice: Subject to any disclaimer, the term of this patent is extended or adjusted under 35 U.S.C. 154(b) by 910 days.

(21) Appl. No.: 10/684,510

(22) Filed: Oct. 15, 2003

(65) Prior Publication Data
US 2005/0086370 A1 Apr. 21, 2005

(51) Int. Cl.
*G06F 13/00* (2006.01)
(52) U.S. Cl. .................. 709/224; 709/217; 719/318
(58) Field of Classification Search ........... 709/217, 709/219, 223, 224, 227, 230; 719/318
See application file for complete search history.

(56) References Cited

U.S. PATENT DOCUMENTS

| | | | |
|---|---|---|---|
| 7,058,968 B2 * | 6/2006 | Rowland et al. ............... 726/1 |
| 7,074,415 B2 * | 7/2006 | Hamel et al. ............. 424/244.1 |
| 7,194,623 B1 * | 3/2007 | Proudler et al. ............. 713/164 |
| 2002/0059410 A1 * | 5/2002 | Hara et al. ................. 709/223 |
| 2003/0028495 A1 * | 2/2003 | Pallante ....................... 705/78 |
| 2005/0232421 A1 * | 10/2005 | Simons et al. .............. 380/255 |

OTHER PUBLICATIONS

New, D., Reliable delivery for syslog, The Internet Society, Nov. 2001.
Rose, M., The Blocks Extensible Exchange Protocol Core, The Internet Society, Mar. 2001.
Kesley, J., Syslog-Sign Protocol, The Internet Society, Aug. 21, 2003.

* cited by examiner

*Primary Examiner*—Viet Vu

(57) ABSTRACT

A modified security protocol for remotely managed computer-based communications devices is presented. The protocol is based on the Syslog Sign protocol but is altered to allow an entity that collects log events from and/or remotely manages the device to provide authenticated acknowledgement of event logs that have been successfully received. This is achieved through an Acknowledgement Block which is signed by the entity and made available to the device.

7 Claims, 2 Drawing Sheets

RELIABLE NON-REPUDIABLE SYSLOG SIGNING AND ACKNOWLEDGEMENT

FIELD OF THE INVENTION

This invention relates to computer based communication systems and more particularly to security protocols for remotely managed devices.

BACKGROUND OF THE INVENTION

There are many instances in which recording or logging an event can serve a useful purpose. This may be, for example, so that information in the logged event can be evaluated or referred to at a later date. Also, it may desirable to establish a real time of an event or the record may be used as evidence that an event actually occurred.

In the field of computer based communications systems it is also useful to maintain a record of certain events. Frequently in this environment a device or a group of devices are controlled by a management entity that is remote from the device or devices. The management entity may serve as a collector of event logs relating to the devices for which it has control. This remote management functionality can be a conduit to security threats against the access points as well as to the transmission media and to the management protocol itself. To answer this, a number of security measures can be put in place and the management protocols themselves can be made as secure as possible.

One of the security measures that has been implemented is the Syslog protocol. The Syslog process has been devised to categorize and log diverse messages and to permit rapid differentiation of notifications or messages relating to problems from notifications which relate to simple status indications.

The Syslog protocol was developed to provide a transport media to allow a machine to send event notification messages across IP networks to event message collectors which are also known as Syslog servers. The process, application and operating systems used in the Syslog protocol lack uniformity as to the content of messages. For this reason there is no attempt to format or to assure the contents of the messages. The protocol is simply designed to transport event messages to the collector where they are stored. In all cases there is one device that originates the message. The Syslog process on that machine may send the message to a collector but no acknowledgement of the receipt is made. Typically, the integrity of Syslog messages can be a critical security issue.

In an attempt to rectify this problem there have been a number of proposals to make Syslog more secure. In this regard integrity and confidentiality are both considered important however integrity is the key issue.

Syslog Sign introduces a mechanism of adding origin authentication, message integrity, replay resistance, message sequencing and detection of missing messages. Syslog Sign attempts to provide these security features in a way that has minimal requirements and minimal impact on existing Syslog implementations. Thus Syslog Sign has many key benefits and in particular the backward compatibility with existing Syslog collectors and the notion of periodic digital signatures which protect against log modification.

In addition to Syslog protocol and Syslog Sign, Reliable Syslog and BEEP are being developed. As noted above Syslog itself provides a simple protocol for event of logging but there are no security mechanism nor are there any means to provide guarantee delivery or reliability. Syslog Sign adds a level of security by providing for signed messages from the device to the server (collector). Unfortunately, there is no way for the device to verify correct receipt and there are no mechanisms to guarantee delivery.

Reliable Syslog adds a new extension to the protocol by providing a layer of reliability. Reliable Syslog suffers from two drawbacks, however, namely that it is essentially a new protocol and is not compatible with current Syslog protocols and there is no way for the device to prove that the collector received the logs correctly. BEEP only secures the transport and thus on its own is not a solution for long term verification and storage of logs.

Accordingly, there remains a need to develop an improved protocol for event logging and verification.

SUMMARY OF THE INVENTION

The present invention is directed to methods and apparatus for logging events pertaining to remotely managed devices. According to the invention a collector/management entity that remotely manages, and/or collects event logs received from a device provides to the device authenticated acknowledgement of event logs that have been successfully received.

Therefore in accordance with a first aspect of the present invention there is provided a method of logging events relating to a remotely managed device in a computer-based communications system, the method comprising: signing, at a collector entity that collects event logs received from the device, an Acknowledgement Block (AB); and making the AB available to the device.

In an embodiment of the invention the collector entity also serves as a management entity to remotely manage the device.

In accordance with a second aspect of the invention there is provided an apparatus for logging events relating to a remotely managed device in a computer-based communications system, comprising: means, at a collector entity that collects log events received by the device, to generate an Acknowledgement Block (AB) and to make the AB available to the device.

BRIEF DESCRIPTION OF THE DRAWINGS

The invention will now be described in greater with reference to the drawings wherein.

DETAILS DESCRIPTION OF THE INVENTION

Figure 1:
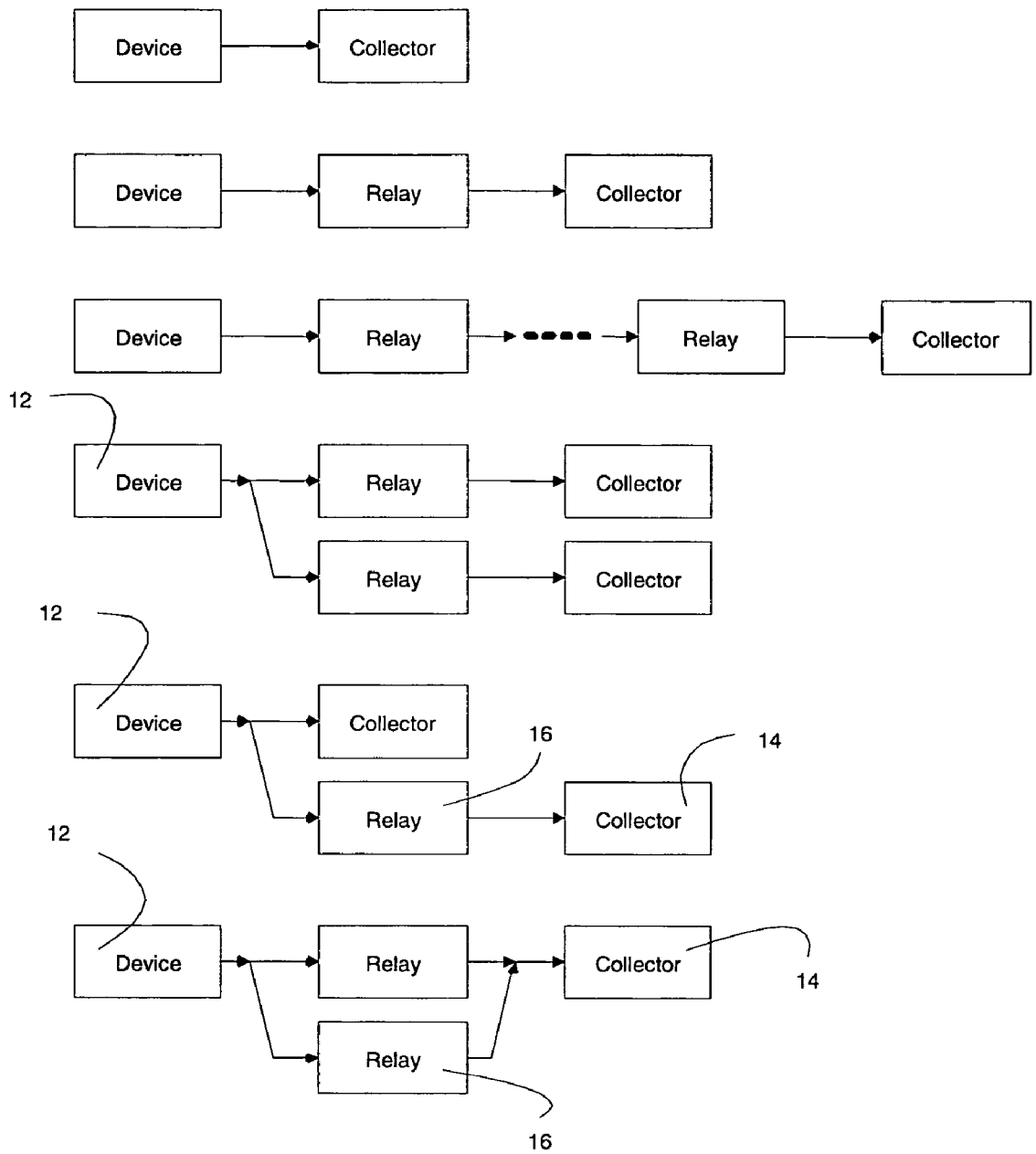
FIG. 1 illustrates some possible architectures relevant to the present invention.

FIG. 1 illustrates some of the possible architectures for which the present invention pertains. The figure shows optional configurations wherein a device 12 sends messages directly to a collector 14 or where the device sends messages to the collector through one or more relays 16 either in series or in parallel.

According to the invention a new message is added to the aforementioned Syslog Sign protocol. As indicated previously the Syslog Sign protocol has some significant advantages including its ability to maintain backward compatibility with current Syslog protocols. Any standard Syslog collector can accommodate the new protocol, only the Syslog device needs to be modified. Further, the security is not reliant on the transport and is stored with the traditional Syslog message and thus can be checked offline at a later time. There is non-repudiation of the device messages i.e. the collector can prove that the device sent all correctly received messages. The Syslog Sign protocol, however, includes the aforementioned short comings which are addressed by the present invention. Hence, the invention seeks to preserve most of the aforementioned benefits while adding the following properties: reliable transmission; non-repudiation of the collector i.e. the device can now prove that the collector received all messages and prevention of an attack where someone tries to hide some mischievous activity by blocking/diverting all incriminating logs.

According to the invention a new message must be sent from the collector to the device for the protocol to complete. This is a new message which is not part of the Syslog or the Syslog Sign standards. However it could be part of an SNMP MIB or maybe a return Syslog message where the role of device and collector are reversed.

Thus, according to the new message added to the Syslog Sign protocol the collector, periodically, signs an acknowledgement block (AB) and makes it available to the device. The term periodically is presumed to be configurable based on the number of log messages or the time interval between messages. The acknowledgement block contains the following fields:

last correctly received Syslog Sign block last correctly received Syslog message since above-mentioned Sign block; and a bit map of all correctly received packets since the above message.

Figure 2:
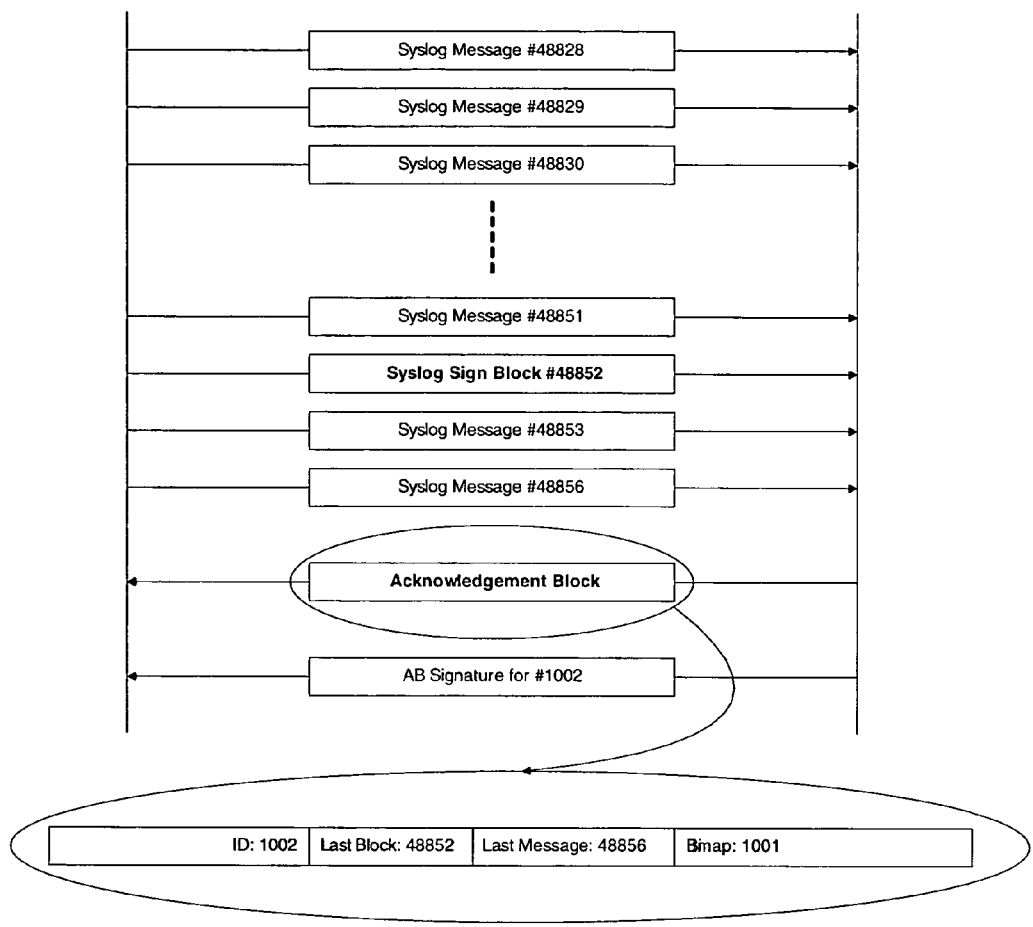
FIG. 2 shows a messaging sequence with the Acknowledgement Block.

FIG. 2 illustrates one embodiment of Acknowledgement Block and the fields which are contained in it. It also shows a number of sequential events or messages followed by a Syslog Sign message and the AB.

It is also within the scope of the present invention for the collector/management entity to sign the AB and to include the signature in the AB.

Optionally, a Syslog Sign block number that has not been correctly received, i.e. where the signature does not match can be generated. It is contemplated that the Syslog sign block number message will be limited to a maximum of one instance per bad signature block to prevent certain kinds of cryptographic attacks or denial of service attacks.

The device can continue to log messages as usual but can optionally store all unconfirmed messages and re-send messages which have not been confirmed or have been confirmed to be part of a bad signature block.

The invention may also add an initial message from the device to the collector indicating that the device can accept the new message types.

Although particular embodiments of the invention can be described and illustrated it will be apparent to one skilled in the art that numerous changes can be made without departing from the basic concept of the invention. It is to be understood, however, that such changes will fall within the full scope of the invention as defined by the appended claims.

The invention claimed is:

1. A method of logging events relating to a remotely managed device in a computer-based communications system, the method comprising:

periodically signing, at a collector/management entity that collects event logs from the device and remotely manages the device, an Acknowledgement Block (AB) that authenticates event logs that have been received; and making the AB available to the device, wherein the AB comprises the following fields:

a last correctly received Syslog Sign block, a last correctly received Syslog message since the Sign block, and a bitmap of all correctly received packets since the last correctly received Syslog message.

2. The method as defined in claim 1 wherein the period of signing is based on a time interval between log events received by the collector/management entity.

3. The method as defined in claim 1 wherein the period of signing is based on the number of log events received by the collector/management entity.

4. The method as defined in claim 1 wherein, responsive to the device receiving an AB indicating that an event log was not correctly received by the collector/management entity, the device resends a stored unconfirmed event log.

5. An apparatus for logging events relating to a device in a computer-based communications system, comprising:

a collector/management entity configured to:

remotely manage the device, collect event logs from the device, generate and periodically sign an Acknowledgement Block (AB) that authenticates event logs received by the collector/management entity, and make the AB available to the device, wherein the AB contains the following fields:

a last correctly received Syslog Sign block, a last correctly received Syslog message since the Sign block, and a bitmap of all correctly received packets since the last correctly received Syslog message.

6. The apparatus as defined in claim 5 wherein the period of signing is based on a time interval between log events received by the collector/management entity.

7. The apparatus as defined in claim 5 wherein the period of signing is based on the number of log events received by the collector/management entity.

* * * * *